(12) United States Patent
Ostermann et al.

(10) Patent No.: US 8,867,825 B2
(45) Date of Patent: Oct. 21, 2014

(54) METHOD AND APPARATUS FOR DETERMINING A SIMILARITY OR DISSIMILARITY MEASURE

(75) Inventors: Ralf Ostermann, Hannover (DE); Markus Schlosser, Hannover (DE)

(73) Assignee: Thompson Licensing, Issy les Moulineaux (FR)

( * ) Notice: Subject to any disclaimer, the term of this patent is extended or adjusted under 35 U.S.C. 154(b) by 69 days.

(21) Appl. No.: 13/558,314

(22) Filed: Jul. 25, 2012

(65) Prior Publication Data

US 2013/0051657 A1 Feb. 28, 2013

(30) Foreign Application Priority Data

Aug. 30, 2011 (EP) .................................... 11306083

(51) Int. Cl.
| | | |
|---|---|---|
| *G06K 9/00* | (2006.01) | |
| *G06K 9/34* | (2006.01) | |
| *G06T 7/00* | (2006.01) | |
| *G06K 9/62* | (2006.01) | |

(52) U.S. Cl.
CPC ............ *G06K 9/00986* (2013.01); *G06K 9/342* (2013.01); *G06T 7/0075* (2013.01); *G06K 9/6215* (2013.01); *G06T 2207/20076* (2013.01); *G06K 9/6212* (2013.01)
USPC ........................................................ 382/154

(58) Field of Classification Search
None
See application file for complete search history.

(56) References Cited

U.S. PATENT DOCUMENTS

| 6,038,349 | A * | 3/2000 | Cullen ........................... 382/294 |
| 7,164,790 | B2 * | 1/2007 | Zhang et al. .................. 382/154 |
| 2010/0142824 | A1 | 6/2010 | Lu |
| 2011/0123069 | A1 * | 5/2011 | Kisilev et al. ................. 382/106 |
| 2012/0155747 | A1 * | 6/2012 | Hwang .......................... 382/154 |

FOREIGN PATENT DOCUMENTS

| JP | 2002267441 | 9/2002 |
| KR | 100930286 | 12/2009 |

OTHER PUBLICATIONS

Kanade et al., "A stereo matching algorithm with an adaptive window, Theory and experiment", Proceedings of the 1991 IEEE International Conference, CA (Apr. 1991), pp. 1088-1095.

(Continued)

*Primary Examiner* — Daniel Mariam
(74) *Attorney, Agent, or Firm* — International IP Law Group, PLLC

(57) ABSTRACT

A solution for determining a similarity or dissimilarity measure for a selected pixel of a first image relative to another selected pixel in a second image is described. The first image and the second image form a stereoscopic image pair or part of a multi-view image group. In a first step a first support window containing the selected pixel in the first image is determining. Then a second support window containing the selected pixel in the second image is determining. Subsequently one or more statistical properties of the selected pixel in the first image are calculated to define a probability distribution for the selected pixel in the first image. Finally, pixel similarity or dissimilarity between the first support window and the second support window is aggregated using only those pixels belonging to the probability distribution for the selected pixel in the first image with a probability above a defined minimum.

9 Claims, 3 Drawing Sheets a)

b)

(56) References Cited

OTHER PUBLICATIONS

Motten et al., "A Binary Adaptable Window SoC Architecture for a Stereo Vision Based Depth Field Processor", Proc. VLSISoC Sep. 27-29, 2010, pp. 25-30.
Yoon et al., "Adaptive Support-Weight Approach for Correspondence Search", IEEE Trans. Pattern Anal. Mach. Intell., vol. 28 No. 4, Apr. 2006, pp. 650-656.
Siddhant Ahuja (SID), "Correlation Based Similarity Measures-Summary", http://siddhantahuja.wordpress.com/2010/04/, Apr. 2010.
Lu et al., "Fast Variable Center-Biased Windowing for High-Speed Stereo on Programmable Graphics Hardware", ICIP 2007, 2007, IEEE, Sep. 16, 2007.
Ju et al., "Constant Time Stereo Matching", 2009 13th International Machine Vision and Image Processing Conference, IEEE Computer Society, 2009 IEEE, Sep. 2, 2009.

* cited by examiner

METHOD AND APPARATUS FOR DETERMINING A SIMILARITY OR DISSIMILARITY MEASURE

This application claims the benefit, under 35 U.S.C. §119 of EP Patent Application 11306083.4, filed 30 Aug. 2011.

FIELD OF THE INVENTION

The present invention relates to a method and an apparatus for determining a similarity or dissimilarity measure for a selected pixel of a first image relative to another selected pixel in a second image. More specifically, the invention relates to a method and an apparatus for determining a similarity or dissimilarity measure for a selected pixel of a first image relative to another selected pixel in a second image with a reduced processing overhead for a locally adaptive support aggregation and an improved robustness.

BACKGROUND OF THE INVENTION

In 3D-TV, 3D-video and 3D-cinema, information of two or even more images is joined together for production of a spatial reproduction of image content. Typically, two stereoscopic images are used for computation of depth information, wherein a matching process is applied to find point correspondences in the two input or basic images. The displacement between two corresponding points in the basic images resulting from the different positions of the cameras when capturing the real world scene is commonly referred to as disparity. A 3D-structure, i.e. the depth information of the captured scene, may be reconstructed from these disparities by triangulation if the camera parameters are known. Depth information for the pixels in the basic images is usually integrated into a disparity map containing the result of the respective matching calculations.

The performance of the stereo matching process inherently depends on the underlying image content. Even for ideal conditions there still remain several problems, e.g. occluded areas in one of the input pictures, perspective deformations due to lens distortions, specular reflections or missing texture in some object etc., that make the matching process a challenging task. For some parts of an image it is inherently more difficult to determine accurate values for the disparity, also referred to as disparity estimates, than for others. This leads to varying levels of accuracy and reliability for the disparity estimates.

Window based similarity measures like sum of absolute differences (SAD), sum of squared differences (SSD), or normalized cross-correlation (NCC) are widely used in support aggregation steps of disparity estimators.

In the article T. Kanade et al.: "*A stereo matching algorithm with an adaptive window: Theory and experiment*", IEEE Trans. Pattern Anal. Mach. Intell. Vol. 16 (1994), pp. 920-932, the advantages and disadvantages of using aggregation over support windows are summarized as follows: "A central problem in (local) stereo matching lies in selecting an appropriate window size. The window size must be large enough to include enough intensity variation for reliable matching, but small enough to avoid the effects of projective distortion. If the window is too small and does not cover enough intensity variation, it gives a poor disparity estimate, because the signal (intensity variation) to noise ratio is low. If the window is too large and covers a region in which the depth of scene points (i.e. disparity) varies, then the position of maximum similarity may not represent correct matching due to different projective distortion (sic) in the left and right images. The fattening effect occurs when the selected window contains pixels at different depth."

A number of methods have been proposed based on the implicit assumption that pixels sharing similar colors belong to the same object and also share similar disparities, i.e. are fronto-parallel. These assumptions are not always given, but can often be assumed as long as the support window size does not become too large and the world consists of relatively large and smooth objects. Amongst the proposed methods are adaptive window methods. Here the shape of the support window is adapted to the object borders depicted in the images or video sequences. Obviously this requires additional processing steps to determine or select an appropriate support window size and shape.

Multiple window methods have also been proposed. Here a set of window sizes and shapes is provided where the algorithm selects one of them depending on some quality metrics of the result. Obviously this also causes additional processing steps, as multiple windows need to be aggregated.

In K.-J. Yoon et al.: "*Adaptive Support-Weight Approach for Correspondence Search*", IEEE Trans. Pattern Anal. Mach. Intell. Vol. 28 (2006), pp. 650-656, adaptive support weights in combination with fixed support window shapes and sizes have been proposed. Two independent and combined weights are used, one of them being a factor describing spatial proximity to the center pixel of the support window and the other one being a factor describing color similarity to the center pixel:

$$w(p, q) = w_g(p, q) \cdot w_c(p, q) = \exp\left(-\left(\frac{\Delta g_{pq}}{\gamma_g} + \frac{\Delta c_{pq}}{\gamma_c}\right)\right).$$

A truncated SAD is used for the matching quality measure:

$$tSAD[x, d] = \frac{\sum_{x_i} w_{g12}(x_i, d) \cdot w_{c12}(x_i, d) \cdot \mathrm{Min}(|Y_1(x_i) - Y_2(x_i + d)|; T)}{\sum_{x_i} w_{g12}(x_i, d) \cdot w_{c12}(x_i, d)}.$$

Adaptive support weights result in good disparity estimation results. However, calculating spatial proximity and color similarity weight factors requires considerable processing. In addition, the use of SAD causes issues for real-world footage, as the SAD is not very robust against luminance and color differences between the camera views.

SUMMARY OF THE INVENTION

It is an object of the present invention to propose a solution for determining a similarity or dissimilarity measure for a selected pixel of a first image relative to another selected pixel in a second image with a reduced processing overhead for a locally adaptive support aggregation and an improved robustness.

According to the invention, this object is achieved by a method for determining a similarity or dissimilarity measure for a selected pixel of a first image relative to another selected pixel in a second image, the first image and the second image forming a stereoscopic image pair or part of a multi-view image group, which comprises the steps of:

determining a first support window containing the selected pixel in the first image;

determining a second support window containing the selected pixel in the second image;

calculating one or more statistical properties of the selected pixel in the first image to define a probability distribution for the selected pixel in the first image;

aggregating pixel similarity or dissimilarity between the first support window and the second support window using only those pixels belonging to the probability distribution for the selected pixel in the first image with a probability above a defined minimum.

The solution according to the invention separates the set of pixels in the support window into two sets, one set of pixels belonging to the same object as the center pixel and the other set consisting of the remaining pixels. The calculation of weight factors, e.g. spatial proximity and color similarity weight factors, is simplified by using either 0.0 or 1.0 as weights. Thus a pixel is either included in support aggregation or it is not. This means that the Laplacian kernels used by K.-J. Yoon et al. are replaced with on/off masks. Although this yields slightly worse disparity estimation results it greatly reduces the processing time.

The above approach has the advantage that it is much less demanding and is thus feasible with real-time processing, which is needed for production systems. The method is particularly suited to be implemented as vectorized SIMD (Single Instruction Multiple Data) code or as GPU (Graphics Processing Unit) code.

Advantageously, one or more statistical properties of the selected pixel in the second image are calculated for defining a probability distribution for the selected pixel in the second image, wherein the pixel similarity or dissimilarity is aggregated using only those pixel correspondences belonging to the probability distribution for the selected pixel in the first image as well as the probability distribution for the selected pixel in the second image with a probability above the threshold.

Though it is possible to determine the threshold just from the statistical properties of the selected pixel in the first image, a more elaborated method determines the statistical properties in both support windows and combines the two statistical properties, e.g. by calculating the average value.

Preferably, the statistical properties are mean value and variance or standard deviation for a selected characteristic of the selected pixel calculated from a plurality of pixels in the support window, the plurality of pixels including the selected pixel. Favorably, the plurality of pixels includes four or nine pixels in a center area of the support window. The statistical properties are advantageously calculated from luminance values or color values.

The decision to include or to exclude a pixel in support aggregation is based on the color or luminance similarity between the pixel and the center pixel. Noise affecting the center pixel may thus cause wrong decisions. To solve this issue, instead of relying on a single, potentially noisy center pixel, and calculating proximity and similarity weights related to this center pixel, the two defining parameters of the probability density function for the color or luminance of the center pixel, namely its mean value and standard deviation, are estimated from a small set of pixels in the center area of the support window. With the probability density function being available, a robust, statistically motivated decision is made for every pixel in the support window whether it is part of the same object as the center pixel or part of a different object. Every pixel whose color is similar to the center pixel color with a certain confidence is included in support aggregation. All other pixels are excluded.

Advantageously, an apparatus for determining a similarity or dissimilarity measure for a selected pixel of a first image relative to another selected pixel in a second image, the first image and the second image forming a stereoscopic image pair or part of a multi-view image group, is adapted to perform a method as described above for determining the similarity or dissimilarity measure for the selected pixel

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

In the following the solution according to the invention shall be briefly described with reference to FIGS. 1 to 5.

Figure 1:
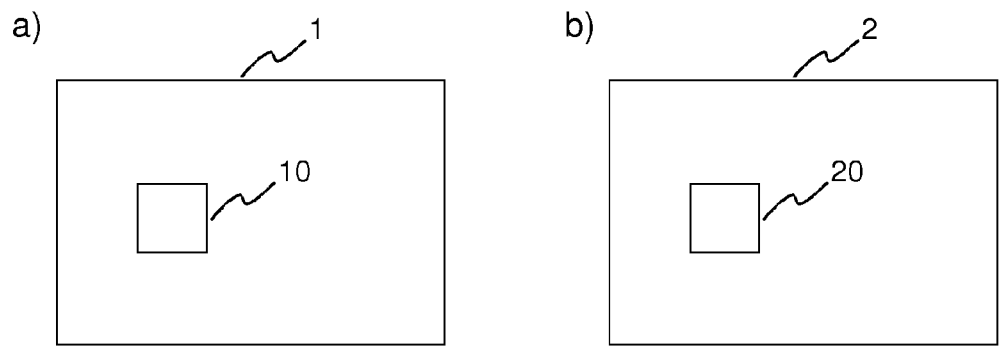
FIG. 1 shows a stereoscopic image pair with support windows.
Figure 2:
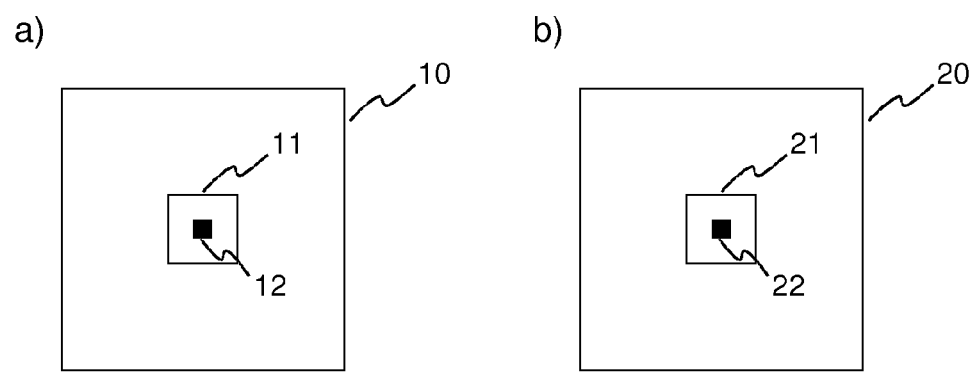
FIG. 2 depicts the support windows of FIG. 1 in more detail.
Figure 3:
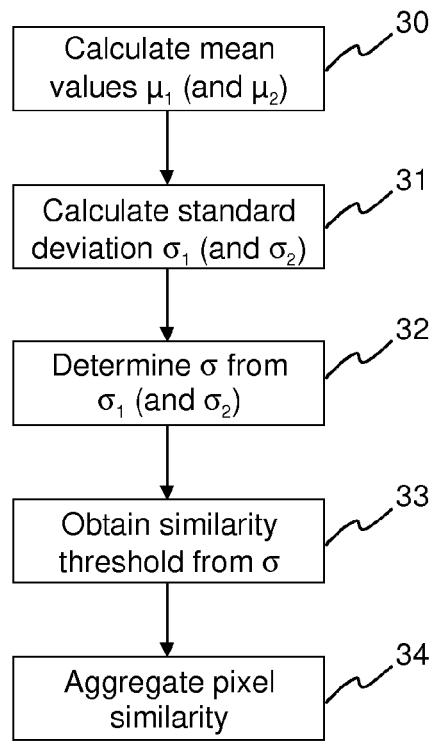
FIG. 3 schematically illustrates a method for determining an aggregated similarity value.
Figure 4:
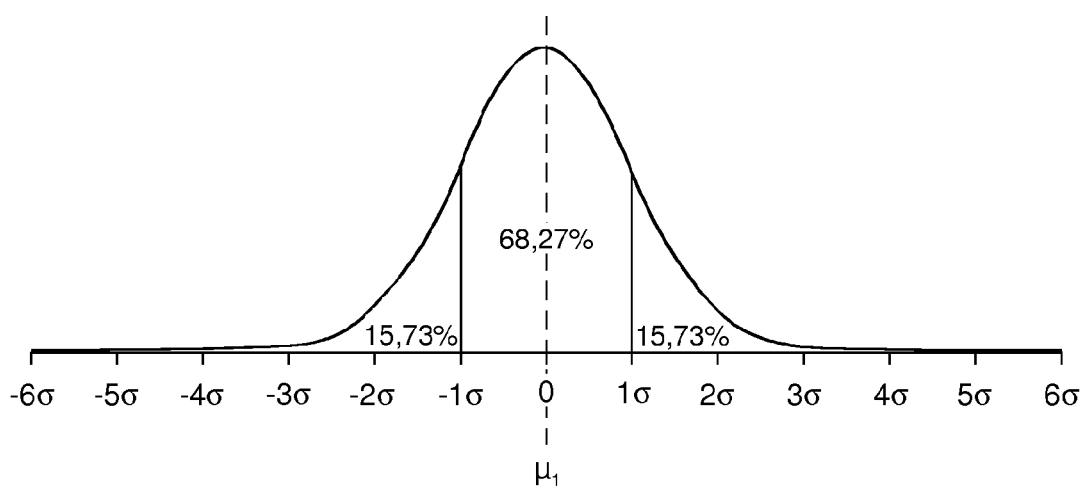
FIG. 4 shows a probability density function of a mean value of the pixel luminance.

FIG. 1 shows a pair of stereoscopic images 1, 2. In each stereoscopic image 1, 2 a support window 10, 20 is depicted. FIG. 2 shows the support windows 10, 20 in more detail. Each support window 10, 20 has a center area 11, 21, which is used for determining a luminance value of the corresponding center pixel 12, 22. FIG. 3 schematically illustrates a method for determining an aggregated similarity value for the center pixels of the support windows 10, 20 for a given disparity. In a first step 30 the mean value $\mu_1$ of the pixel luminance in the center area 11 of the first support window 10 is calculated. Optionally also the mean value $\mu_2$ of the pixel luminance in the center area 21 of the second support window 20 is calculated. In a second step 31 the standard deviation $\sigma_1$ of the pixel luminance in the center area 11 of the first support window 10 is calculated. Optionally also the standard deviation $\sigma_2$ of the pixel luminance in the center area 21 of the second support window 20 is calculated. A standard deviation $\sigma$ is then determined 32 from $\sigma_1$ or from a combination of $\sigma_1$ and $\sigma_2$. This standard deviation $\sigma$ is multiplied 33 by some factor to obtain a luminance similarity threshold. For example, as can be seen from the probability density function shown in FIG. 4, when a threshold of $3\sigma$ is used most of the pixels (>99%) belonging to the probability density of the center pixels 12, 22, i.e. belonging to the same object as the center pixel 12, 22, are included if the luminance follows a Gaussian distribution. In case the pixels of a center area 11, 21 are all identical, i.e. their standard deviation $\sigma$ is 0.0, the luminance similarity threshold is set 35 to a specified minimum value $\sigma_{min}$. Finally, the pixel similarity is aggregated 34 over the full support windows 10, 20 using only those pixels whose absolute difference to their mean value $\mu_x$ is smaller than the luminance similarity threshold. Only if the threshold condition is given for both support windows 10, 20 the pixels are aggregated. This correlates only those pixels that belong to the same object as the center pixels 12, 22.

Figure 5:
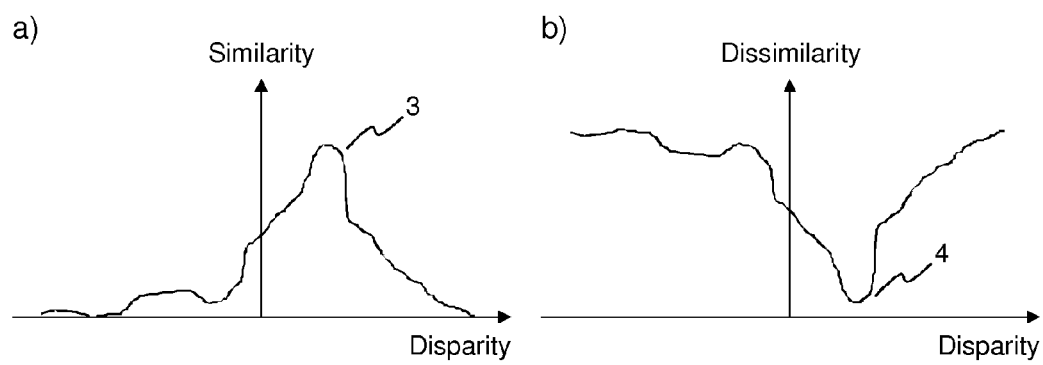
FIG. 5 depicts a similarity curve and a dissimilarity curve in dependence from the disparity.

By performing the above method for a plurality of disparity values, a similarity or dissimilarity curve in dependence of the disparity is determined. Such curves are schematically depicted in FIG. 5. From the extreme values 3, 4 of these curves the most likely disparity estimate for the center pixel 12 of the first support window 10 can easily be determined.

The description above uses pixel luminance for aggregation. Of course, the method can likewise be implemented using color similarity. For example, the color similarity may be derived from the Euclidean distance in RGB space. Apparently, other metrics and/or color spaces may likewise be used.

There are a number of similarity measures known and in use by the computer vision community. Preferably, zero-mean normalized cross-correlation (ZNCC) is used for support aggregation. ZNCC is very robust against the often unavoidable luminance and color difference in multi-camera setups. These are either caused by the differences between cameras or by their different viewpoints.

For a better understanding, the method according to the invention shall now be elaborated in more detail starting from the method proposed in K.-J. Yoon et al.: "*Adaptive Support-Weight Approach for Correspondence Search*", IEEE Trans. Pattern Anal. Mach. Intell. Vol. 28 (2006), pp. 650-656. Starting from this method, a number of modifications are described leading to the proposed method.

As a first measure the Laplacian in the calculation of the spatial proximity and color similarity weight factors is replaced with on/off masks. A similar approach is described by A. Motten et al.: "*A Binary Adaptable Window SoC Architecture for a Stereo Vision Based Depth Field Processor*", Proc. VLSI-SoC 2010, pp. 25-30. Experiments have shown that this is feasible for the spatial proximity weights if the support window size does not become too large. In that case the spatial proximity weights are replaced by 1.0 for all pixels in the support window. In other words, there is no additional calculation overhead required. Using a fixed support window size implicitly provides spatial proximity weights, as pixels outside the support window can be considered as having a weight of 0.0.

Experiments have further shown that the color similarity weight factors are more important than the spatial proximity weight factors. To simplify the calculation, these weights are also replaced by either 1.0 or 0.0. If the color similarity between a pixel in the support window and the center pixel is smaller than a given threshold, the weight factor becomes 1.0. If the similarity is bigger than the given threshold, the weight factor becomes 0.0. Using such kind of mask allows to avoid calculating more precise weight factors, as these can be replaced by a comparison operation. In addition, it also allows to avoid doing a multiplication, as only a logical AND operation is necessary for the weighting.

The use of only the two values 1.0 and 0.0 for the weight factors is in general not inferior than having continuous spatial proximity and/or color similarity weight factors, as except for semi-transparent pixels or mixed pixels at object borders, each pixel either belongs to the same object as the center pixel, or not. The practical difficulty here is finding a good separation between the two sets of pixels. As no separation method is perfect, and spatial proximity as well as color similarity is not a perfect separation criterion either, K.-J. Yoon et al. revert to some sort of soft decision using spatial proximity and color similarity weights.

In order to enable a hard on/off decision, it is necessary to define and implement an appropriate threshold mechanism for color similarity. This mechanism separates the set of pixels in the support window into two sets, one set containing the pixels belonging to the same object as the center pixel and the other set containing the remaining pixels.

First the center pixel value of the support window is determined. As the center pixel is used to determine a reference for all thresholding, it is important that its value is not affected by too much noise. To increase the significance and robustness for this reference the algorithm takes more than just one single pixel in the support window center into account. This can be done in more or less elaborated ways. It should be ensured that there are not too many pixels in the center area, which would cause a foreground fattening effect. At the same time it should also be ensured that enough pixels are used to obtain a good estimate in the presence of noise. In practice a simple average over four or nine pixels in the support window center yielded very good results, i.e. the mean value $\mu$ of the four or nine center pixels is preferably used as the reference color. In case of a support window size with an even number of pixels in each dimension, the four center pixels are used. In case of a support window size with an odd number of pixels in each dimension, nine center pixels are used, where the nine center pixels can optionally be weighted so that the center pixels receive a higher influence. The reference color is independently determined for both support windows to be correlated.

Instead of using a simple mean other statistical measures, like the median value, or some weighted average over the center pixel, can be used.

Now a solution is needed to incorporate more than just those pixels having exactly the same color as the reference color. Otherwise, it could happen that all pixels or some of the center pixels itself are excluded. For this purpose a threshold value is determined. For every pixel located in the support window the absolute color difference between the pixel and the reference color is determined and thereafter compared against the previously determined threshold. The threshold thus allows to control the number and type of pixels to be included in the correlation. Various methods are readily available for determining the threshold value. As a simple approach, it is made sure that the threshold value is larger than a certain minimum value that has been empirically determined. This minimum threshold depends on the disparity estimator to be used and needs to be adapted accordingly.

To improve upon the resulting quality, the variation of the center pixels is incorporated into the threshold. Again, for determining the center pixel variation more or less elaborated methods are available. Favorably the variance is calculated from either the four center pixels or from nine center pixels. In case of a support window size with an odd number of pixels in each dimension, the nine center pixels are used. In case of a support window size with an even number of pixels in each dimension, four center pixels are used, where the nine center pixels are optionally weighted so that the center pixels receive a higher influence. It is to be noted that if the variance is used as a threshold, the squared difference between each pixel and the reference color can be compared against the threshold. This allows to save a square root calculation.

It is possible to determine the threshold from the variance over the center pixels of just one support window. However, a more elaborated method determines the center pixel variation in both support windows and combines the two variations, e.g. by calculating the average value of both center pixel variations. This is done for a number of reasons. First of all, it needs to be ensured that at least the pixels in the center are included in the correlation. If the center pixels are not included in the correlation a very high correlation may be determined from just a few isolated pixels somewhere in the peripheral area of the support window. Combining the variance over both support windows helps to avoid such unwanted high correlations. A real match typically exhibits very similar variance values in both support windows.

In noisy images, the variation of the center pixels will become larger so that in turn the threshold will also become larger and more pixels will be included in the correlation.

Instead of using a simple variance for determining the threshold, any other distance measure can be used, e.g. absolute differences or any other linear or non-linear metric. The choice of the distance measure will generally depend on the capabilities of the processing platform.

Finally, a fixed multiplicative constant is advantageously incorporated. This allows for adjusting the amount of variation, similar to the $3\sigma$ limit that is often used to reject outliers. For example, a dependency on the ratio between the number of pixels in the center and the number of pixels in the support window can be included. A constant of approximately $3\sigma$ is used for center areas including four pixels, and a constant of approximately $2\sigma$ is used for center areas including 16 pixels, assuming a support window size of 16×16 pixels. Having more pixels in the center area will increase the reliability of the variation estimate. At the same time, more variation of the pixels in the center area will be introduced if the support window gets closer to an object border. This would cause more pixels to be included in the correlation for an unchanged threshold, which is undesirable for the proposed approach.

Looking at this from a different perspective, if there are pixels belonging to multiple objects inside the support window, the distribution of colors should look like a bimodal or multi-modal probability density. The task to be solved is finding a good threshold to separate pixels belonging to the mode of the center pixels from the other modes. Choosing a large variance will include more pixels, but chances are that these belong to a different mode.

Once a robust threshold has been determined, correlating pixels in both support windows is started. Only pixels whose color difference to the reference color is below the threshold are being correlated with each other. Experiments have shown that best results are achieved when this is the case in both support windows simultaneously. If, for example, the color difference of the top left pixel in one support window is below the threshold, and the color difference of the top left pixel in the other support window is also below the threshold, both pixels are being correlated with each other. If one difference is above the threshold both pixels are not correlated.

What is claimed is:

1. A method for determining a similarity or dissimilarity measure for a selected pixel of a first image relative to another selected pixel in a second image, the first image and the second image forming a stereoscopic image pair or part of a multi-view image group, the method comprising the steps of:
   determining a first support window containing the selected pixel in the first image;
   determining a second support window containing the selected pixel in the second image;
   calculating one or more statistical properties of the selected pixel in the first image to define a probability distribution for the selected pixel in the first image;
   aggregating pixel similarity or dissimilarity between the first support window and the second support window using only those pixels belonging to the probability distribution for the selected pixel in the first image with a probability above a defined threshold, which is derived from the one or more statistical properties of the selected pixel in the first image.

2. The method according to claim 1, wherein the statistical properties are mean value and variance or standard deviation for a selected characteristic of the selected pixel calculated from a plurality of pixels in the first support window, the plurality of pixels including the selected pixel.

3. The method according to claim 2, wherein the plurality of pixels includes four or nine pixels in a center area of the first support window.

4. The method according to claim 1, further comprising the step of calculating one or more statistical properties of the selected pixel in the second image for defining a probability distribution for the selected pixel in the second image, wherein the pixel similarity or dissimilarity is aggregated using only those pixel correspondences belonging to the probability distribution for the selected pixel in the first image as well as the probability distribution for the selected pixel in the second image with a probability above the defined threshold.

5. The method according to claim 4, wherein the statistical properties are mean value and variance or standard deviation for a selected characteristic of the selected pixel calculated from a plurality of pixels in the second support window, the plurality of pixels including the selected pixel.

6. The method according to claim 5, wherein the plurality of pixels includes four or nine pixels in a center area of the second support window.

7. The method according to claim 1, wherein the statistical properties are calculated from luminance values or color values.

8. An apparatus for determining a similarity or dissimilarity measure for a selected pixel of a first image relative to another selected pixel in a second image, the first image and the second image forming a stereoscopic image pair or part of a multi-view image group, wherein the apparatus comprises a processing platform configured to perform the steps of:
   determining a first support window containing the selected pixel in the first image;
   determining a second support window containing the selected pixel in the second image;
   calculating one or more statistical properties of the selected pixel in the first image to define a probability distribution for the selected pixel in the first image;
   aggregating pixel similarity or dissimilarity between the first support window and the second support window using only those pixels belonging to the probability distribution for the selected pixel in the first image with a probability above a defined threshold, which is derived from the one or more statistical properties of the selected pixel in the first image.

9. The apparatus according to claim 8, wherein the processing platform is a graphics processing unit.

* * * * *